US011451637B2

United States Patent
Venkataraman et al.

(10) Patent No.: US 11,451,637 B2
(45) Date of Patent: Sep. 20, 2022

(54) METHOD FOR MIGRATION OF SESSION ACCOUNTING TO A DIFFERENT STATEFUL ACCOUNTING PEER

(71) Applicant: Telefonaktiebolaget LM Ericsson (publ), Stockholm (SE)

(72) Inventors: Natarajan Venkataraman, Bangalore (IN); Parag Narayanrao Pote, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/766,452

(22) PCT Filed: Dec. 2, 2017

(86) PCT No.: PCT/IN2017/050566
§ 371 (c)(1),
(2) Date: May 22, 2020

(87) PCT Pub. No.: WO2019/106681
PCT Pub. Date: Jun. 6, 2019

(65) Prior Publication Data
US 2021/0037103 A1 Feb. 4, 2021

(51) Int. Cl.
*H04L 67/148* (2022.01)
*H04L 9/40* (2022.01)
(Continued)

(52) U.S. Cl.
CPC ........ *H04L 67/148* (2013.01); *H04L 63/0892* (2013.01); *H04L 65/1069* (2013.01);
(Continued)

(58) Field of Classification Search
CPC ..... H04L 67/148; H04L 67/146; H04L 69/40; H04L 63/0892; H04L 65/1069;
(Continued)

(56) References Cited

U.S. PATENT DOCUMENTS

2010/0191858 A1* 7/2010 Thomas .............. H04L 65/1069
709/231
2012/0131639 A1* 5/2012 Alex ..................... H04L 67/148
726/3

(Continued)

OTHER PUBLICATIONS

PCT International Search Report and Written Opinion dated Feb. 23, 2018 for International Application No. PCT/IN2017/050566, 8 pages.

(Continued)

*Primary Examiner* — Kyung H Shin
(74) *Attorney, Agent, or Firm* — Sage Patent Group

(57) ABSTRACT

A method for migrating a subscriber session from a first authentication, authorization and accounting (AAA) accounting peer to a second AAA accounting peer, where the first AAA accounting peer is stateful. The method includes receiving an accounting start packet from an AAA client application, forwarding the accounting start packet to the first AAA accounting peer, receiving an accounting update or accounting stop packet from the AAA client application; and sending an accounting start packet from the AAA client application to the second AAA accounting peer, in response to a connection failure with the first AAA accounting peer.

20 Claims, 8 Drawing Sheets

(51) Int. Cl.
   *H04L 65/1069* (2022.01)
   *H04L 69/40* (2022.01)
   *H04L 67/142* (2022.01)
   *H04L 67/143* (2022.01)
   *H04L 67/146* (2022.01)

(52) U.S. Cl.
   CPC .......... *H04L 67/142* (2013.01); *H04L 67/143* (2013.01); *H04L 67/146* (2013.01); *H04L 69/40* (2013.01)

(58) Field of Classification Search
   CPC . H04L 65/4076; H04L 67/142; H04L 67/143; H04W 4/24; H04W 15/66; H04N 15/00; H04N 15/66; H04M 15/66; H04M 15/00
   See application file for complete search history.

(56) References Cited

U.S. PATENT DOCUMENTS

| | | |
|---|---|---|
| 2014/0040975 A1 | 2/2014 | Raleigh et al. |
| 2017/0048136 A1 | 2/2017 | Williams |

OTHER PUBLICATIONS

Fajardo et al., "Diameter Base Protocol", Internet Engineering Task Force, Request for Comments: 6733, Oct. 2012, 152 pages.
Extended European Search Report for European Patent Application No. 17933194.7 dated May 25, 2021, 9 pages.

* cited by examiner

METHOD FOR MIGRATION OF SESSION ACCOUNTING TO A DIFFERENT STATEFUL ACCOUNTING PEER

CROSS-REFERENCE TO RELATED APPLICATIONS

This application is a 35 U.S.C § 371 national stage application for International Application No. PCT/IN2017/050566, entitled "METHOD FOR MIGRATION OF SESSION ACCOUNTING TO A DIFFERENT STATEFUL ACCOUNTING PEER", filed on Dec. 2, 2017, the disclosures and contents of which are hereby incorporated by reference in their entireties.

TECHNICAL FIELD

Embodiments of the invention relate to the field of session migration; and more specifically, to the handling of a stateful session migration between accounting peers.

BACKGROUND

Internet service providers (ISP), cellular network providers and similar networking infrastructures are designed to enable a large number of end user devices to have connectivity with services via these networks as well as access to services via the broader Internet. These networks are generally administered by the network provider and the characteristics of the access (e.g., bandwidth allotment and data allowances) are based on service contracts between end users and the network providers.

These networks utilize metrics and traffic engineering protocols to monitor the usage of the network resources by end users and to manage this usage. Often the end user devices connect through local radio access networks (e.g., with cellular networks) or via customer premise equipment (e.g., broadband modems) that are the initial connecting points to these provider networks. These components provide access points to the networks and may be connected with various edge devices such as border gateways that manage access to the broader provider network. These border gateways (e.g., broadband network gateway (BNG)) or edge routers may service the end user devices and work in connection with authentication, authorization and accounting (AAA) services in the provider network to keep metrics and accounting relative to each end user.

For example, the AAA services in the provider network can authenticate or authorize initial end user access to the provider networks. The AAA services can also configure the characteristics of the end user access at the BNG or similar network devices in the provider network. The AAA services can use various protocols for the network devices in the provider network to interact with them. One AAA protocol that is commonly utilizes is the remote authentication dial-in user service (RADIUS). A closely related AAA protocol called Diameter was initially designed to replace RADIUS, but RADIUS has continued to be utilized in many types of networks with Diameter being utilized in others.

SUMMARY

The embodiments include a method for migrating a subscriber session from a first authentication, authorization and accounting (AAA) accounting peer to a second AAA accounting peer, where the first AAA accounting peer is stateful. The method includes receiving (501) an accounting start packet from an AAA client application, forwarding the accounting start packet to the first AAA accounting peer, receiving an accounting update or accounting stop packet from the AAA client application, and sending an accounting start packet from the AAA client application to the second AAA accounting peer, in response to a connection failure with the first AAA accounting peer.

In another embodiment, a network device configured to execute a plurality of virtual machines, where the virtual machines are configured to support network function virtualization (NFV). The plurality of virtual machines support the method for migrating a subscriber session from a first AAA accounting peer to a second AAA accounting peer, where the first AAA accounting peer is stateful. The network device includes a non-transitory computer readable medium (648) having stored therein a AAA client, and a processor coupled to the non-transitory computer readable medium configured to execute a virtual machine from the plurality of virtual machine, the virtual machine to execute the AAA client. The AAA client is configured to receive an accounting start packet from an AAA client application, to forward the accounting start packet to the first AAA accounting peer, receive an accounting update or accounting stop packet from the AAA client application, and to send an accounting start packet from the AAA client application to the second AAA accounting peer, in response to a connection failure with the first AAA accounting peer.

The embodiments further encompass a computing device configured to execute the method for migrating a subscriber session from a first AAA accounting peer to a second AAA accounting peer, where the first AAA accounting peer is stateful. The computing device includes a non-transitory computer readable medium having stored therein a AAA client, and a processor coupled to the non-transitory computer readable medium configured to execute the AAA client. The AAA client is configured to receive an accounting start packet from an AAA client application, to forward the accounting start packet to the first AAA accounting peer, receive an accounting update or accounting stop packet from the AAA client application, and to send an accounting start packet from the AAA client application to the second AAA accounting peer, in response to a connection failure with the first AAA accounting peer.

In one embodiment, a control plane device is in a network including a plurality of data plane devices. The control plane device is in communication with the plurality of data plane devices and configured to implement the method for migrating a subscriber session from a first AAA accounting peer to a second AAA accounting peer, where the first AAA accounting peer is stateful. The control plane device includes a non-transitory computer readable medium (748) having stored therein a AAA client, and a processor (742) coupled to the non-transitory computer readable medium configured to execute the AAA client, the AAA client configured to receive an accounting start packet from an AAA client application, to forward the accounting start packet to the first AAA accounting peer, to receive an accounting update or accounting stop packet from the AAA client application, and to send an accounting start packet from the AAA client application to the second AAA accounting peer, in response to a connection failure with the first AAA accounting peer.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
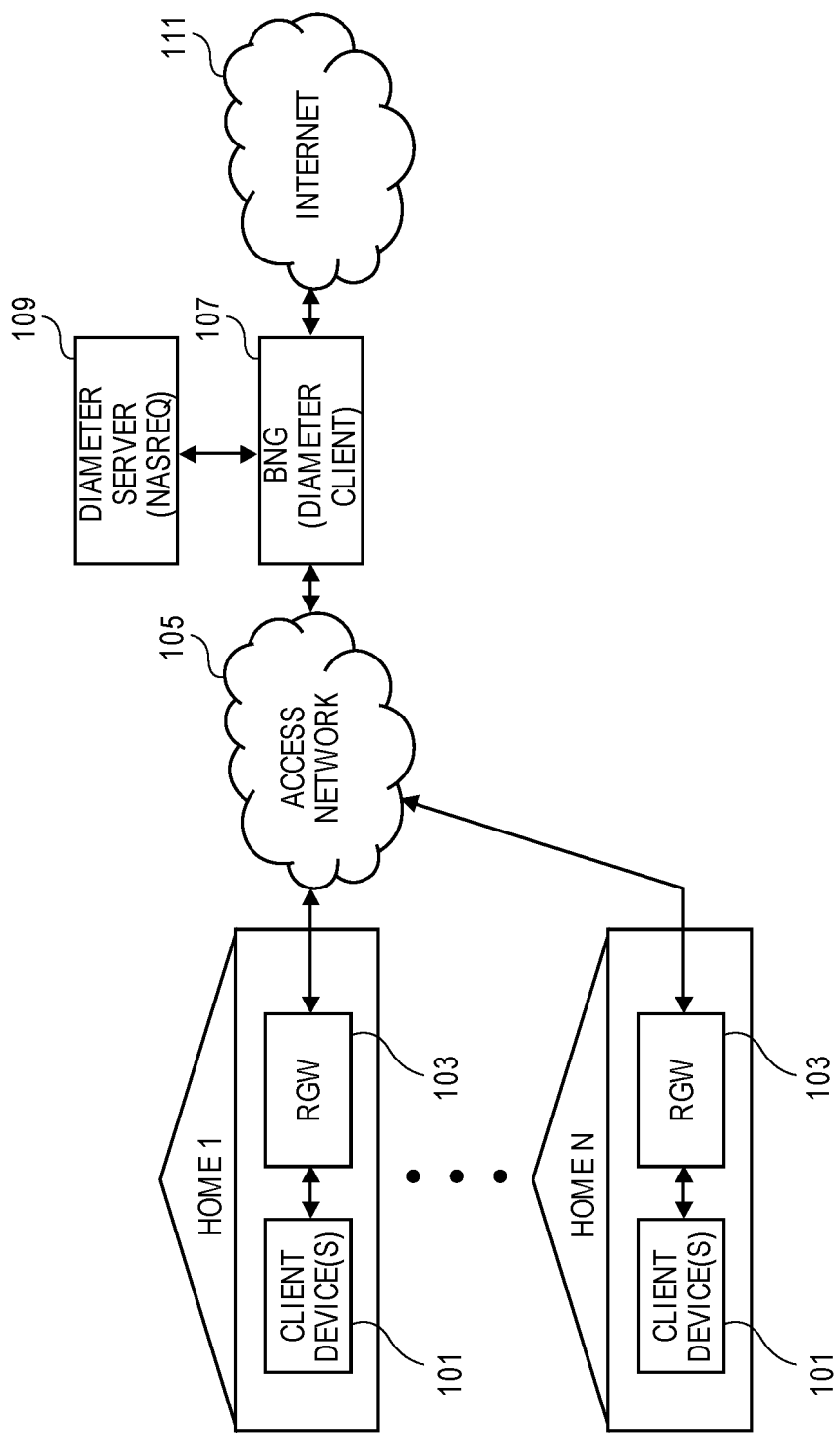
FIG. 1 is a diagram of one embodiment of an example network including an authentication, authorization and accounting (AAA) service.

The following description describes methods and apparatus for enabling a transparent migration of a stateful accounting session between one accounting service and another accounting service. The embodiments re-mark accounting packets such that from the perspective of the new accounting service the expected sequence of accounting packets is seen including the sequence starting with an accounting start message followed by an accounting interim message and followed by an accounting stop message. The embodiments are transparent to the client applications meaning that the client applications will not need to manage this transition and incorporate complexity to accommodate accounting server availability issues. The client applications do not need to handle the migration or have information about the capabilities of the accounting services.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments are compatible with various authentication and accounting protocols. One skilled in the art would appreciate that the principles, processes and structures described herein are applicable to other authentication, authorization and accounting (AAA) protocols, however, the examples herein are primarily drawn to the Diameter protocol for sake of conciseness and clarity.

Diameter

The Diameter protocol is an AAA protocol which is widely used in the cellular or 'mobile' networks. Increasingly, with fixed-mobile convergence (FMC) of increased interest, i.e., the use of the same technologies in traditional 'fixed' networks and current 'mobile' networks, broadband remote access (BRAS) gateways and broadband network gateways (BNGs) are also starting to feature Diameter as the primary AAA protocol, often replacing RADIUS and similar technologies.

The Diameter protocol consists of a base protocol (defined in RFC-6733) and Diameter applications which can be defined by various standard bodies. The Diameter base protocol defines various Diameter nodes, including Diameter Clients, Servers and Agents. Diameter Clients talks to Diameter Servers, either directly or via Diameter Agents. As used herein, a 'Diameter Peer,' is discussed, which could be either a Diameter Server or an Diameter Agent. More generally, each of these components could be referred to as AAA clients, servers, agents and peers.

Diameter Clients are typically the AAA enforcing nodes, such as the BNG node. A Diameter Client can be characterized as including at least two logical components, namely, a Client Application of Diameter (herein a Diameter Client Application, client application or more generally an AAA client application), which is a client application of the Diameter protocol and a Diameter Client Protocol Stack (herein a Diameter protocol stack or more generally an AAA protocol stack), which provides Diameter protocol service to one or more of the Diameter Client Applications. The Diameter Clients need connectivity to a Diameter Peer such as a Diameter Server in order to perform all of the normal AAA actions. The Diameter Servers could be stateful, i.e., the Diameter Servers have a particular operating 'state' that defines the current operation of the Diameter Server. The current state can be a configuration of the Diameter Server and its resources and may be managed by an internal state machine. For stateful accounting, for any AAA session, the Diameter Server and its accounting components need to receive the "start-accounting" message at the beginning of the accounting session and the "stop-accounting" message at the end of the accounting session. The Diameter protocol defines both stateless and stateful mode for Diameter accounting servers.

For redundancy and load-balancing reasons, multiple Diameter Peers (i.e., multiple Diameter Servers) are configured. When subscriber sessions (communication sessions between the Diameter client and a subscriber related device) are being handled, the BNG node (executing the Diameter Client) chooses a specific Diameter Peer (Diameter Server) at subscriber session establishment time, based on a variety of load-balancing algorithm considerations. The Diameter Peer remains associated with the subscriber session for the lifetime of the session.

AAA in Network Architecture

FIG. 1 is a diagram of one embodiment of an example network where an AAA protocol may be utilized. In this simplified example, a set of client devices 101 that connect to a network provided by an Internet Service Provider (ISP) or mobile service provider. The example illustrates a fixed network, but the principles and techniques are equally applicable to a mobile network. In the example, the client devices 101 connect to residential gateways (RGWs) or similar network devices that are the edge of the ISP or mobile network. The home or local networks of the users may include additional devices such as access points and home routers. The RGWs provide connectivity to an access network 105 that enable a number of various subscribers (i.e., the owners of the client devices 101) to connect to the Internet and services provided by the ISP or mobile network. The RGWs enable connection to BNGs or BRAS via the access network.

The BNG (or BRAS) 107 provides various services for managing subscriber services including enforcing AAA policies. The embodiments also encompass any network device that handles subscribers using an AAA protocol to manage subscriber accounting data such as an authentication federation gateway (AGF) or user plane function (UPF). The BNG may handle many types of subscribers. The subscriber type is based on how a subscriber session is setup with the BNG. Dynamic session establishment is done using protocols such as point to point over Ethernet (PPPoE/PPP) or Layer 2 tunneling protocol (L2TP/PPP) and using Dynamic Host Configuration Protocol (DHCP) protocols. There are also modes to setup a subscriber session based on Internet Protocol (IP)-packet flow from the subscriber. A dynamic session is established in response to the subscriber connecting to the BNG. A static session establishment is done via configuration. Such subscriber sessions are long lived sessions, i.e., a static session is established once configured by an administrator and must remain functioning until torn down via configuration by an administrator.

The BNG 107 can implement the AAA functions for enforcement of policies on subscriber sessions via an AAA client (e.g., a Diameter Client). The AAA client communicates with an AAA server 109 (e.g., a Diameter Server). The AAA server manages the policies and performs accounting functions, authorization functions and authentication functions. The AAA server then directs or configures the AAA client to implement the AAA policies as needed. Such AAA policies can manage the subscriber access to other services and the Internet 111 including refusing connections, managing bandwidth and tracking resource usage according to a subscriber contract.

AAA Subscriber Session Handling

Figure 2:
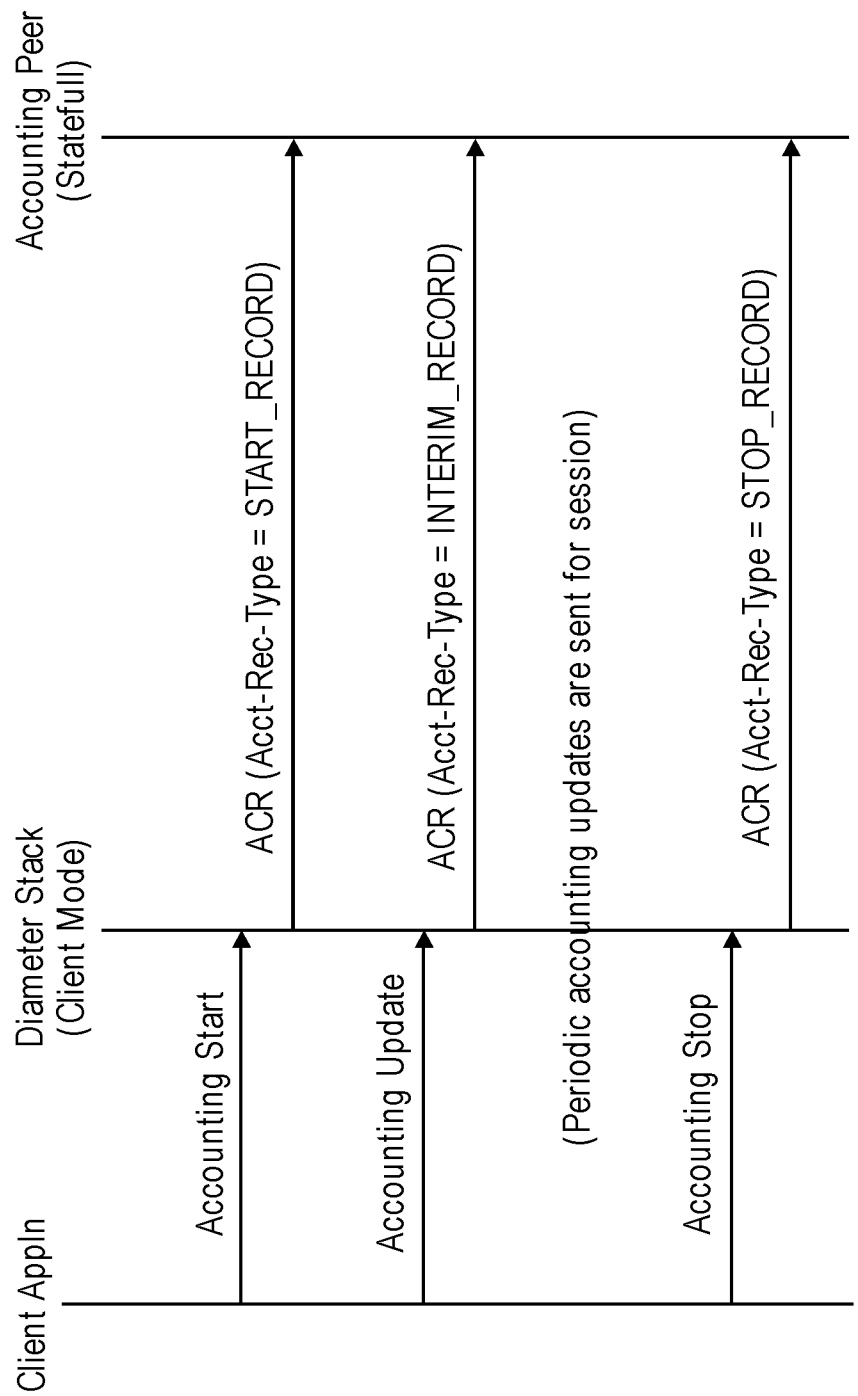
FIG. 2 is a diagram of one embodiment of a process for an accounting exchange for a AAA session.

FIG. 2 is a diagram of a basic accounting exchange between a AAA client application and a stateful AAA peer. In this example, a client application can be any application, often implemented at the BNG or similar subscriber gateway nodes, that communicates with an AAA server in this case a stateful AAA server. A client application that needs to use the AAA (e.g., Diameter) protocol will have the following logical components an AAA (e.g., Diameter) stack, which handles the AAA protocol aspects of the communication with the AAA server (e.g., a Diameter Server/Peer) and a AAA (e.g., Diameter) client application, which uses the AAA (e.g., Diameter) stack to exchange information with AAA peers. A single AAA stack instance could provide AAA protocol handling support to multiple AAA client applications. The diagram of FIG. 1 illustrates a simple accounting exchanges for a session.

The client application initiates the session with an Accounting Start request to the AAA (e.g., Diameter) stack. The AAA stack generates an Accounting Record Type (ACR)=Start_Record request to the stateful AAA server. As events occur that require accounting updates (e.g., bandwidth utilization) or at periodic intervals, the client application generates an Accounting Update to the AAA stack, which in turn generates an ACR=Interim_Record that provides updated information for the accounting by the AAA server. This type of update can continue until the client application sends an Accounting Stop message to the AAA stack at the end of the session. The AAA stack then generates an ACR=Stop_Record to notify the AAA server to end the recording of accounting information being reported by the client application.

Problems with this system occur where there is an interruption in the communication with the AAA peer (e.g., the AAA server). For the Diameter protocol for example, the Diameter base protocol defines one optional server-side state machine that may be utilized by applications that require keeping track of the session state at the accounting server. Such tracking is incompatible with the ability to handle long duration connectivity problems. Therefore, the use of this state machine is recommended only in applications where the value of the Accounting-Realtime-Required attribute value pair (AVP) is DELIVER_AND_GRANT. Therefore, accounting connectivity problems are required to cause the serviced user to be disconnected. Otherwise, records produced by the client may be lost by the server, which no longer accepts them after the connectivity is re-established.

Thus, RFC 6733 requires a subscriber session to be torn down (i.e., terminated) when there is a problem in sending accounting information to a stateful Diameter accounting peer. This is a problem for BNG nodes that are executing the Diameter client applications or similar AAA client applications. For subscriber sessions established via dynamic host configuration protocol (DHCP) as the session signaling protocol, there is no way to signal a subscriber to bring down (i.e., terminate) the subscriber session. Enhancements to DHCP such as "DHCP FORCERENEW" are not implemented by many DHCP clients. It is possible to have short lease times provided to subscribers, but that just reduces the disruption time when the subscriber session is terminated due to accounting server connectivity issues. In addition, for static subscriber sessions, there is automatic support for the teardown of subscriber sessions, since teardown happens via administrator configuration removal. In some embodiments, it is possible to do an implicit teardown and bring up of a session immediately, but that causes traffic disruption.

The embodiments overcome the deficiencies of the prior arty by providing that in the event of connectivity disruption to a AAA peer (e.g., a Diameter accounting server) that has been assigned to handle a subscriber session (chosen at session establishment time from multiple available AAA peers), the embodiments are able to select another AAA peer (e.g., another available Diameter accounting peer) and send subsequent accounting packets of the same given session to the newly selected AAA peer without having to end and re-establish the subscriber session. The embodiments insulate the AAA client application (e.g., a Diameter client application) from the knowledge of such changes to the assigned AAA peer (Diameter peer) associated with a subscriber session. The embodiments thereby remove complexity in programming any such functionality into the client applications. AAA client applications can thus focus on information generation and consumption and leave AAA protocol resiliency aspects to the AAA protocol stack.

The embodiments enable this functionality by migrating a subscriber session to a new AAA peer even when the AAA peer is stateful without ending the subscriber session. That process ensures that the new AAA peer session receives accounting packets with appropriate message types accounting-start, accounting-interim and accounting-stop, in the correct order. The embodiment re-mark an accounting packet so that from the perspective of a newly selected stateful AAA server (e.g., a Diameter accounting server), the expected sequence of accounting packets is seen, specifically the "accounting start," followed by "accounting interim" followed by "accounting stop" packets. The embodiments also ensure that the various client applications that required AAA protocol support, need not have to incorporate complexity due to AAA server availability issues. The client applications need not be coded to track the availability of AAA peers, or whether the AAA peer is stateful or stateless.

In some embodiments, the processes described herein are applied specifically to the Diameter protocol and remove the limitation imposed by the Diameter base protocol specification (RFC 6733) and provides a way to have resiliency in the face of stateful Diameter accounting peer connectivity problems so that there is no session impact, thereby avoiding any traffic disruptions, and client applications are kept simple and ignorant of resiliency issues, thereby avoiding complexity to solution. In these embodiments, when a subscriber session is established, the Diameter stack will select a Diameter accounting peer, from the available choices of Diameter accounting peers. Whenever a Diameter peer is assigned new to a session, the Diameter stack will maintain state information indicating a new diameter peer is attached.

Overview of Transparent AAA Migration Process

The embodiments support AAA client application that send accounting information to AAA peers. The embodiments encompass multiple mechanisms for transferring information via the AAA protocol (e.g., Diameter) stack. In one embodiment, the AAA client may send a message (e.g., Diameter message such as the Accounting-Request or ACR packet) to the AAA protocol stack. In another embodiment, the AAA client may send the counters (i.e., accounting information) alone via a proprietary application programmer interface (API) with the AAA protocol stack. The ACR packet, or the proprietary API, must contain information as to whether the message is for an "accounting start" or "accounting interim" or "accounting stop." A stateful AAA accounting server will require "accounting start" before any other accounting information message is sent and before the "accounting stop" message is received.

Figure 3:
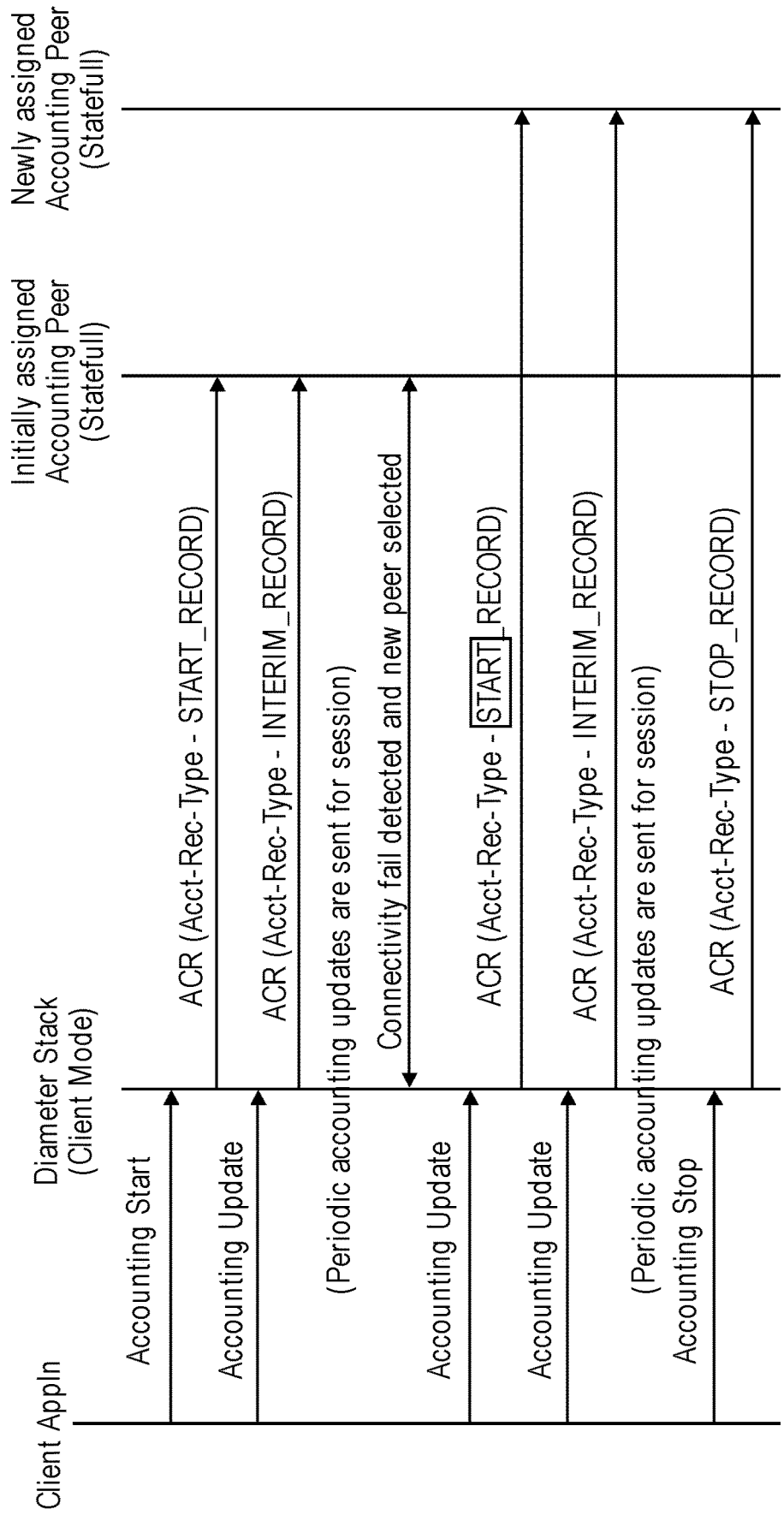
FIG. 3 is a diagram of one embodiment of a process for a transparent migration to a new AAA peer, where the existing AAA peer failure is detected and the AAA client has sent an accounting update message.

FIG. 3 is a diagram of one embodiment of a process for a transparent migration to a new AAA peer in response to a connectivity failure with a current AAA peer. The diagram describes a transparent way by which the AAA protocol stack can handle AAA peer change to a new stateful AAA peer. In this example illustrated case, the process is initiated when the AAA client application sends accounting-start packet to the AAA protocol stack. The AAA protocol stack sends the accounting-start packet itself or similar accounting-start message to an initially selected AAA peer. In one embodiment, the accounting-start packet is an ACR packet with type of Start_Record.

Similarly, accounting update messages are forwarded while the initially assigned AAA server is available. These accounting update messages may be ACR packets with a type of Interim_Record. The client application can continue to send the accounting update messages to the initially assigned AAA server as long as it's available. If the client application completes its accounting related functions it can send an accounting stop packet to the AAA protocol stack which in turn sends the packet to the initially assigned AAA peer. For example, in the form of an ACR packet of type Stop_Record. However, if at any time the initially selected AAA server becomes unavailable, then the AAA protocol stack may select a new AAA peer to handle the accounting tasks previously handled by the initially selected AAA server.

After selecting a new AAA accounting peer, the AAA protocol stack re-marks or re-labels the accounting update message as an accounting start packet to the newly selected replacement AAA accounting peer, for example as an ACR packet of type Start_Record. Any subsequent updates to accounting functions can be sent to the new AAA accounting server via accounting update packets or ACR packets of type Interim_Record. When the accounting functions are complete the AAA protocol stack will receive an accounting stop packet from the AAA client application and forward it to the new AAA accounting peer, for example as an ACR packet of type Stop_Record.

Figure 4:
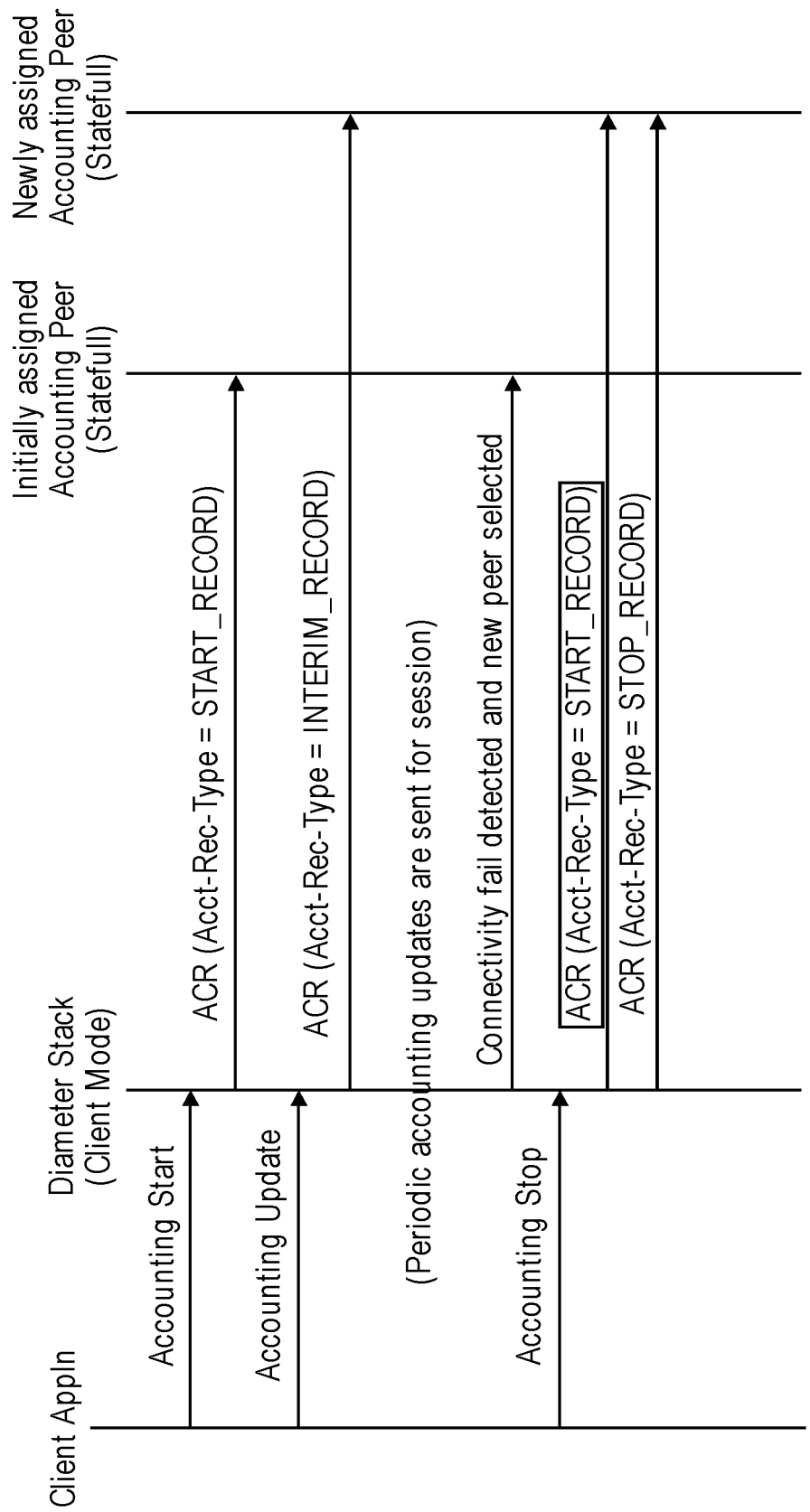
FIG. 4 is a diagram of one embodiment of a process for handling a transparent migration to a new AAA peer, where the existing AAA per failure is detected and the client has sent an accounting stop message.

FIG. 4 is a diagram of one embodiment of a process for a transparent migration to a new AAA peer in response to a connectivity failure with a current AAA peer. The diagram illustrates the case where the AAA client application sends an accounting stop message just as the connectivity to the AAA server is lost. In this case, the AAA protocol stack is configured to internally generate and send an accounting start message to the newly selected AAA accounting peer before forwarding the received accounting stop packet, for example as an ACR of type Stop_Record. In one example embodiment, when the AAA client application sends the accounting-stop packet, then the AAA protocol stack will duplicate the message, mark the first message as accounting-start and the next message is sent as the accounting-stop. The values of the statistics contained in the packets can remain the same or one can have an empty set. The process initiates as with the previous example with the AAA protocol stack selecting an AAA accounting peer and forwarding the accounting start and accounting update packets as they are received up to the point that connectivity is lost.

The sending of the accounting start packet is the first packet for a newly selected AAA accounting peer, but subsequent packets are relayed from the AAA client application. In some cases, the accounting messages for a subscriber session may need to be sent to multiple AAA accounting peers. In a scenario where accounting information for a subscriber session is being sent to multiple AAA servers, the transparent migration process would be done by the AAA stack for each of the failed AAA servers. AAA transmission proceeds normally for the rest of the AAA servers. In each transparent migration to a newly selected AAA accounting peer, the newly selected AAA accounting peer must first be sent the accounting start packet by repurposing the data in an interim or stop packet. Modifications to the packets received by the AAA protocol stack may be undertaken in response to connectivity failures to a current AAA accounting server. For existing AAA accounting peers, the message from AAA client application may be sent unmodified or an equivalent of the received message must be forwarded to the current AAA accounting server.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5:
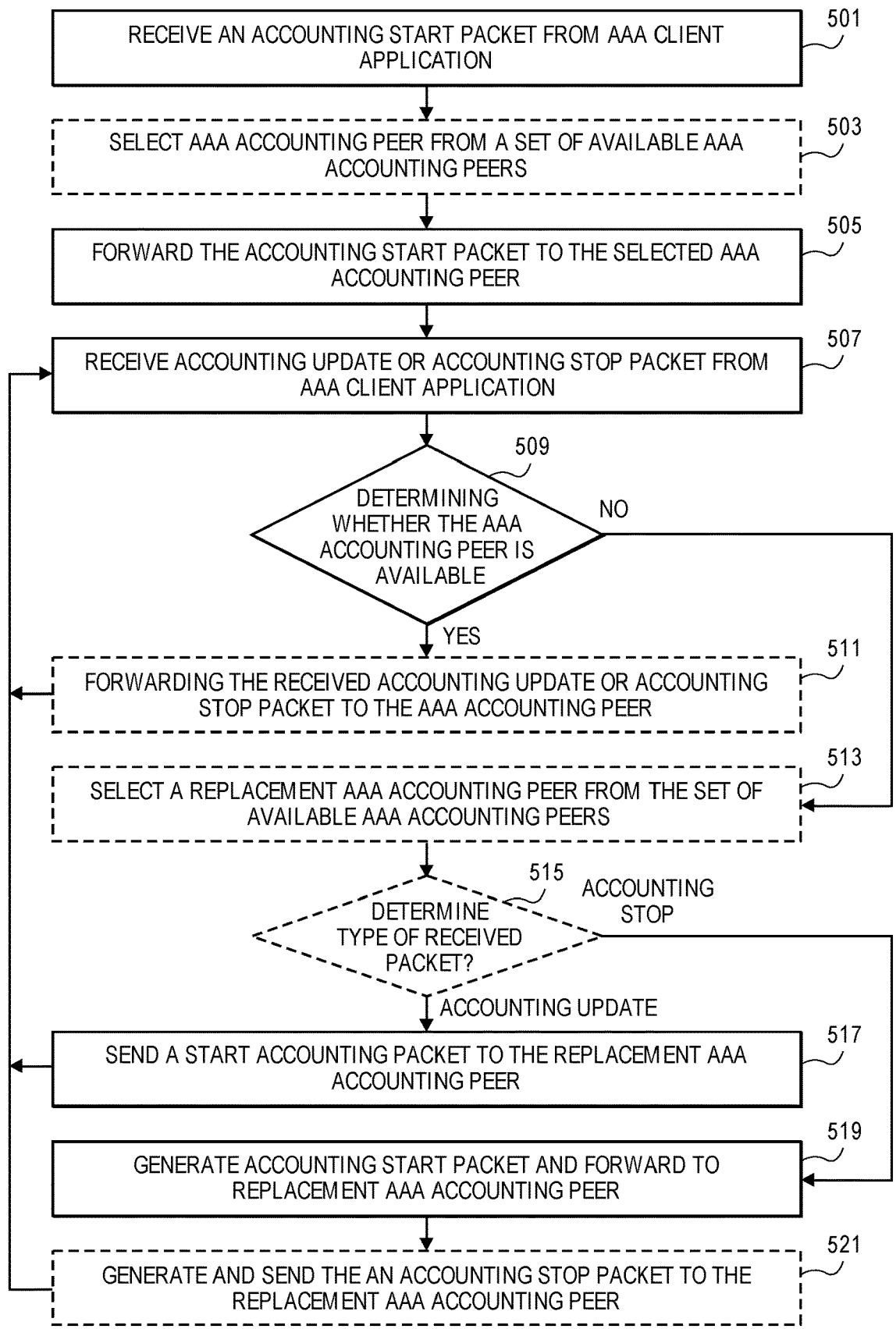
FIG. 5 is a diagram of one embodiment of the migration process at the network device executing the authentication client.

FIG. 5 is a flowchart of one embodiment of a process for handling transparent migration between AAA protocol peers by the AAA protocol stack. In one embodiment the process is initiated by the AAA protocol stack (e.g., a Diameter protocol stack) receiving an accounting start packet (e.g., an ACR of type Start_Record) (Block 501). In response to receiving this accounting start packet, the AAA protocol stack may select an available AAA accounting peer to service the AAA related functions of the AAA client application that sent the accounting start packet (Block 503). In other embodiment, an AAA accounting peer may be selected at an earlier point in time such as when the subscriber session is started between the AAA client application and the client device of the end user.

The AAA protocol stack may either forward the received accounting start packet or may generate a similar packet or message to be sent to the selected AAA accounting peer (Block 505). The AAA protocol stack may then await further communication from the AAA client application while tracking or being made aware of the AAA accounting peer. The arrival of a further accounting update or accounting stop packet from the AAA client application may then occur (Block 507). In response to receiving the accounting update or accounting stop packet, the process of the AAA protocol stack determines whether the selected AAA accounting peer is still available (Block 509). The AAA protocol stack can use any mechanism to track the availability of the AAA accounting peer including polling, timeouts and similar mechanisms to determine the availability of systems. If the selected AAA accounting peer is still available, then the AAA protocol stack may forward the received accounting update or accounting stop packets to the AAA accounting peer (Block 511). The packets may be ACR of types Interim_Record or Record_Stop, respectively. If the packet received was an accounting stop packet, then the process may complete. If the packet received was an accounting update packet, then the process may await the arrival of a next packet from the AAA client application (Block 507).

If the AAA accounting peer is not available, then the AAA protocol stack selects a replacement AAA accounting peer from the set of available AAA accounting peers using any selection mechanism (Block 513). The selection of an available AAA accounting peer as a replacement for the previously selected AAA accounting peer can utilize any selection mechanism or load balancing process to identify an AAA accounting peer suitable to service the AAA protocol stack. Once a replacement AAA accounting peer is selected, a determination of the type of received AAA packet can be made, namely whether it is an accounting update or accounting stop packet (Block 515). If the received packet was an accounting update then, the AAA protocol stack sends a start accounting packet to the replacement AAA accounting peer (Block 515), which may contain the information provided in the received accounting update. The accounting start packet can be generated as a new packet with the same information as the received accounting update or the accounting update packet can be re-marked (Block 517). Where the received packet was an accounting stop packet, then an accounting start packet is generated and sent (Block 519) and then a subsequent accounting stop packet or similar message is send to the replacement AAA accounting peer (Block 521). In this case, the received packet may be duplicated and one packet relabeled as the accounting start which is forwarded before the accounting stop packet, with each having the same values or one having an empty set. Where the received packet is an accounting stop packet, then the process may complete. However, if the received packet was an accounting update packet, then the process may continue to await the next packet from the AAA client application (Block 507).

Figure 6A:
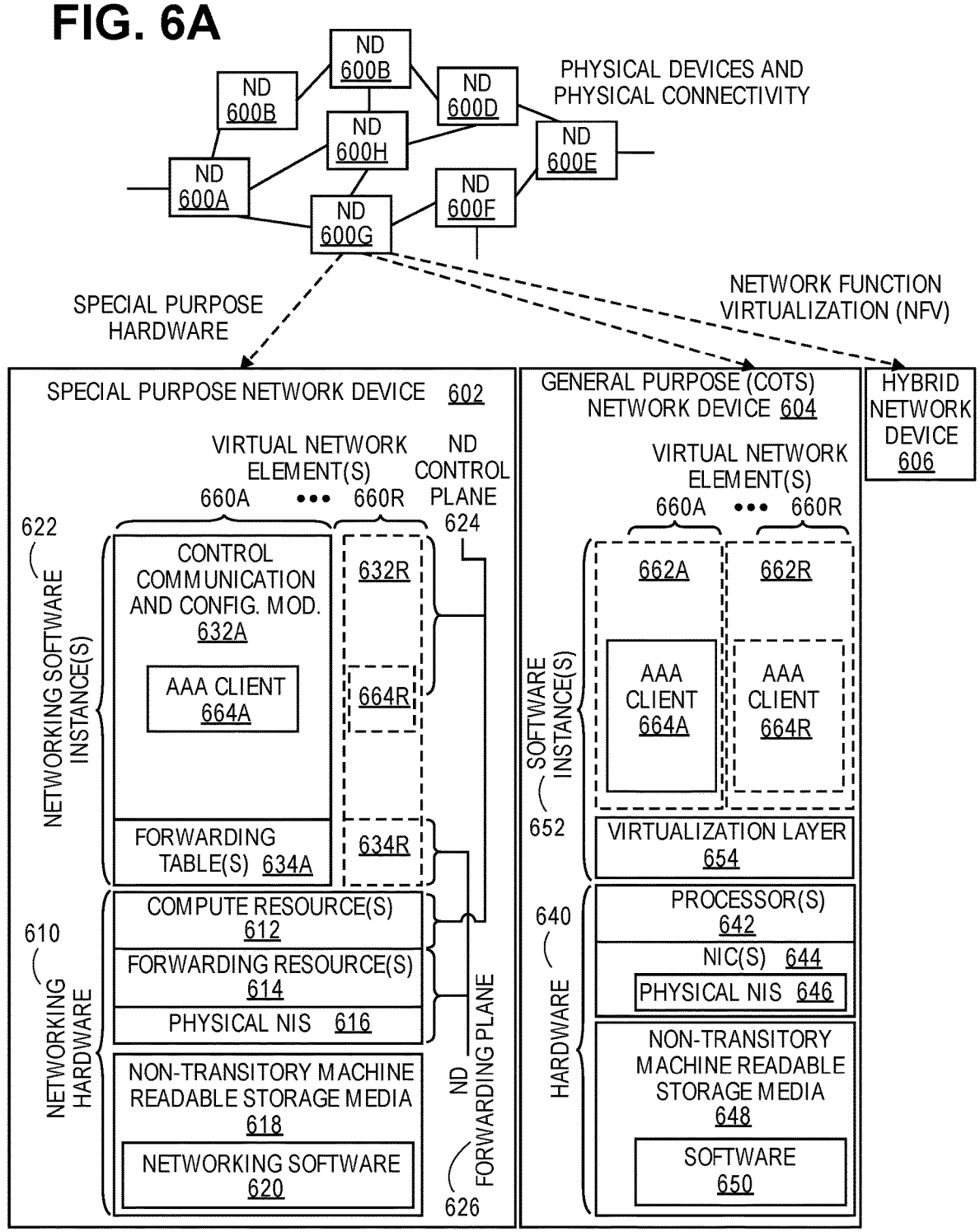
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine-readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
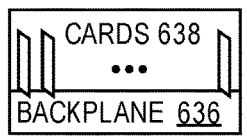
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R. The Applications 664A-R can include AAA clients as described herein. The AAA clients may encompass AAA client applications and/or AAA protocol stacks. These embodiments further encompass Diameter implementations.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
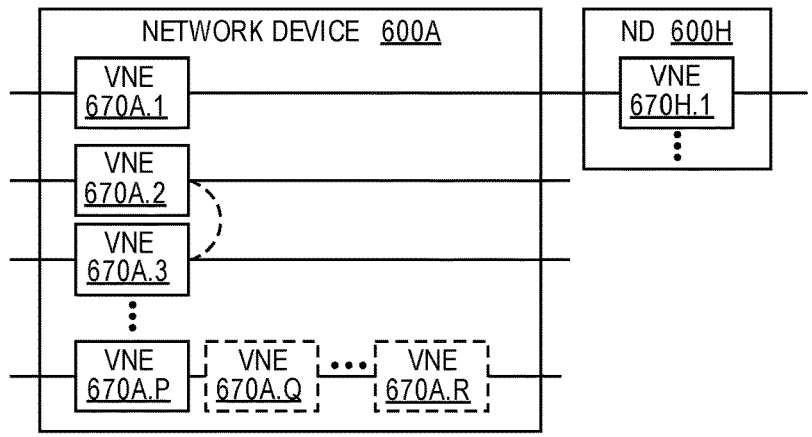
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
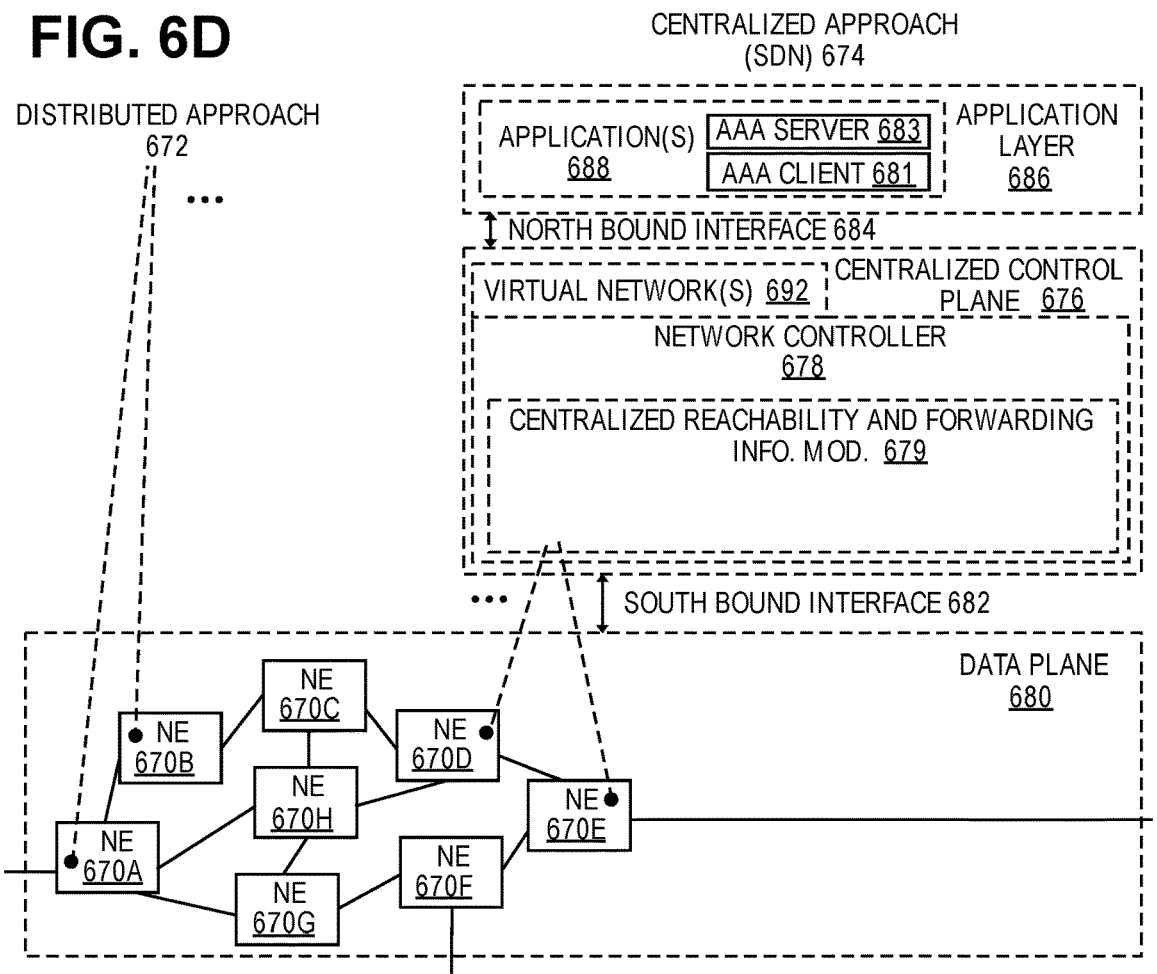
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized MultiProtocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The Applications 688 may include AAA servers 683 and AAA clients 681 as described herein. The AAA clients may encompass AAA client applications and/or AAA protocol stacks. These embodiments further encompass Diameter implementations.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
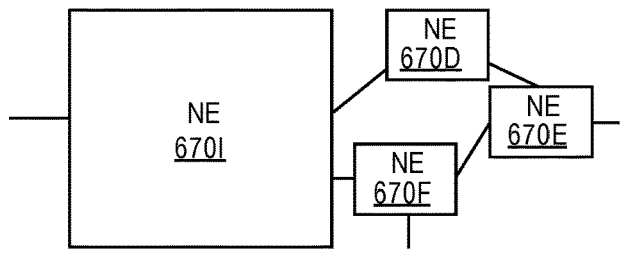
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
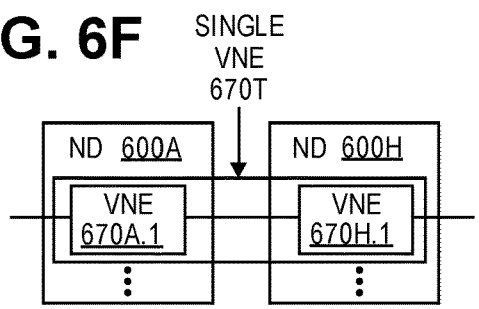
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
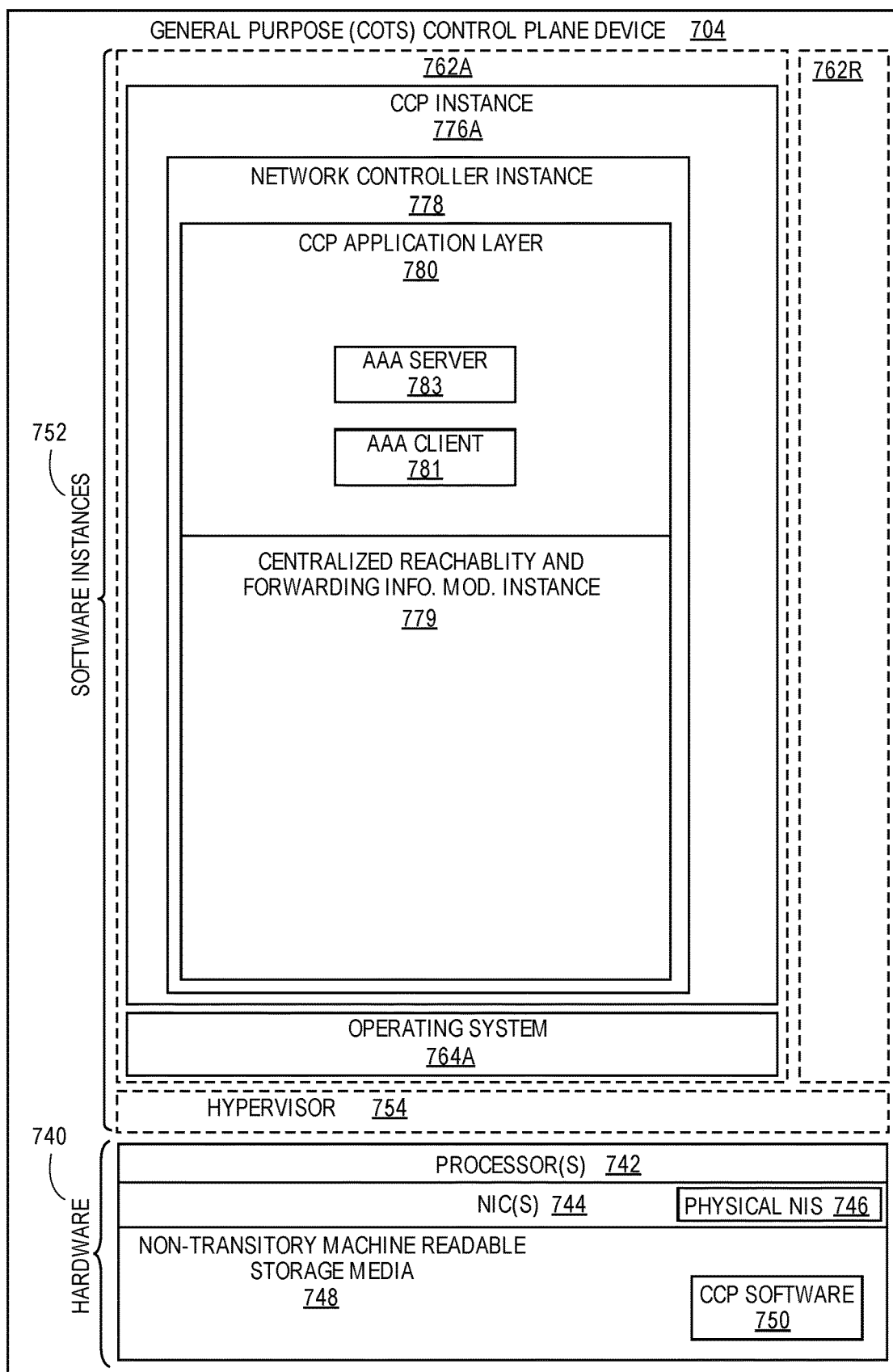
FIG. 7 illustrates a general-purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device 704 including hardware 740 comprising a set of one or more processor(s) 742 (which are often COTS processors) and physical NIs 746, as well as non-transitory machine-readable storage media 748 having stored therein centralized control plane (CCP) software 750.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view. The Application layer 780 may support AAA servers 783 and AAA clients 681 as described herein. The AAA clients may encompass AAA client applications and/or AAA protocol stacks. These embodiments further encompass Diameter implementations.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for migrating a subscriber session from a first authentication, authorization and accounting (AAA) accounting peer to a second AAA accounting peer, where the first AAA accounting peer is stateful, the method comprising:
    receiving an accounting start packet from an AAA client application;
    forwarding the accounting start packet to the first AAA accounting peer;
    receiving an accounting update or accounting stop packet from the AAA client application;
    selecting the second AAA accounting peer from the available accounting peers, in response to determination of a connection failure with the first AAA accounting peer;
    determining whether the received packet is the accounting update packet or the accounting stop packet;
    re-marking or re-labeling the accounting update packet, from the AAA client application, as an accounting start packet; and
    sending the re-marked or re-labeled accounting start packet from the AAA client application to the second AAA accounting peer.

2. The method of claim 1, further comprising:
    sending the accounting stop packet from the AAA client application to the second AAA accounting peer in response to receiving the accounting stop packet.

3. The method of claim 2, wherein the accounting start packet is a copy of the accounting stop packet received from the AAA client application.

4. The method of claim 1, further comprising:
    determining whether the first AAA accounting peer is available in response to receiving the accounting update or accounting stop packet.

5. The method of claim 1, wherein an AAA protocol utilized by the first AAA accounting peer, second AAA accounting peer, AAA protocol stack and AAA client application is Diameter.

6. A network device configured to execute a plurality of virtual machines, the virtual machines configured to support network function virtualization (NFV), the plurality of virtual machines to support a method for migrating a subscriber session from a first authentication, authorization and accounting (AAA) accounting peer to a second AAA accounting peer, where the first AAA accounting peer is stateful, the network device comprising:
    a non-transitory computer readable medium having stored therein a AAA client; and
    a processor coupled to the non-transitory computer readable medium configured to execute a virtual machine from the plurality of virtual machine, the virtual machine to execute the AAA client, the AAA client configured to receive an accounting start packet from an AAA client application, to forward the accounting start packet to the first AAA accounting peer, to receive an accounting update or accounting stop packet from the AAA client application, to select the second AAA accounting peer from the available accounting peers, in response to determination of a connection failure with the first AAA accounting peer, to determine whether the received packet is the accounting update packet or the accounting stop packet, to re-mark or re-label the accounting update packet, from the AAA client application, as an accounting start packet; and to send the re-marked or re-labeled accounting start packet from the AAA client application to the second AAA accounting peer.

7. The network device of claim 6, wherein the AAA client is further configured to send the accounting stop packet from the AAA client application to the second AAA accounting peer in response to receiving the accounting stop packet.

8. The network device of claim 6, wherein the accounting start packet is a copy of the accounting stop packet received from the AAA client application.

9. The network device of claim 8, wherein the AAA client is further configured to determine whether the first AAA accounting peer is available in response to receiving the accounting update or accounting stop packet.

10. The network device of claim 6, wherein an AAA protocol utilized by the first AAA accounting peer, second AAA accounting peer, AAA protocol stack and AAA client application is Diameter.

11. A computing device configured to execute a method for migrating a subscriber session from a first authentication, authorization and accounting (AAA) accounting peer to a second AAA accounting peer, where the first AAA accounting peer is stateful, the computing device comprising:
a non-transitory computer readable medium having stored therein a AAA client; and
a processor coupled to the non-transitory computer readable medium configured to execute the AAA client, the AAA client configured to receive an accounting start packet from an AAA client application, to forward the accounting start packet to the first AAA accounting peer, to receive an accounting update or accounting stop packet from the AAA client application, to select the second AAA accounting peer from the available accounting peers, in response to determination of a connection failure with the first AAA accounting peer, to determine whether the received packet is the accounting update packet or the accounting stop packet, to re-mark or re-label the accounting update packet, from the AAA client application, as an accounting start packet; and to send the re-marked or re-labeled accounting start packet from the AAA client application to the second AAA accounting peer.

12. The computing device of claim 11, wherein the AAA client is further configured to send the accounting stop packet from the AAA client application to the second AAA accounting peer in response to receiving the accounting stop packet.

13. The computing device of claim 12, wherein the accounting start packet is a copy of the accounting stop packet received from the AAA client application.

14. The computing device of claim 11, wherein the AAA client is further configured to determine whether the first AAA accounting peer is available in response to receiving the accounting update or accounting stop packet.

15. The computing device of claim 11, wherein an AAA protocol utilized by the first AAA accounting peer, second AAA accounting peer, AAA protocol stack and AAA client application is Diameter.

16. A control plane device in a network including a plurality of data plane devices, the control plane device in communication with the plurality of data plane devices and configured to implement a method for migrating a subscriber session from a first authentication, authorization and accounting (AAA) accounting peer to a second AAA accounting peer, where the first AAA accounting peer is stateful, the control plane device comprising:
a non-transitory computer readable medium having stored therein a AAA client; and
a processor coupled to the non-transitory computer readable medium configured to execute the AAA client, the AAA client configured to receive an accounting start packet from an AAA client application, to forward the accounting start packet to the first AAA accounting peer, to receive an accounting update or accounting stop packet from the AAA client application, to select the second AAA accounting peer from the available accounting peers, in response to determination of a connection failure with the first AAA accounting peer, to determine whether the received packet is the accounting update packet or the accounting stop packet, to re-mark or re-label the accounting update packet, from the AAA client application, as an accounting start packet; and to send the re-marked or re-labeled accounting start packet from the AAA client application to the second AAA accounting peer.

17. The control plane device of claim 16, wherein the AAA client is further configured to send the accounting stop packet from the AAA client application to the second AAA accounting peer in response to receiving the accounting stop packet.

18. The control plane device of claim 17, wherein the accounting start packet is a copy of the accounting stop packet received from the AAA client application.

19. The control plane device of claim 16, wherein the AAA client is further configured to determine whether the first AAA accounting peer is available in response to receiving the accounting update or accounting stop packet.

20. The control plane device of claim 16, wherein an AAA protocol utilized by the first AAA accounting peer, second AAA accounting peer, AAA protocol stack and AAA client application is Diameter.

* * * * *